United States Patent Office 3,314,613
Patented Apr. 18, 1967

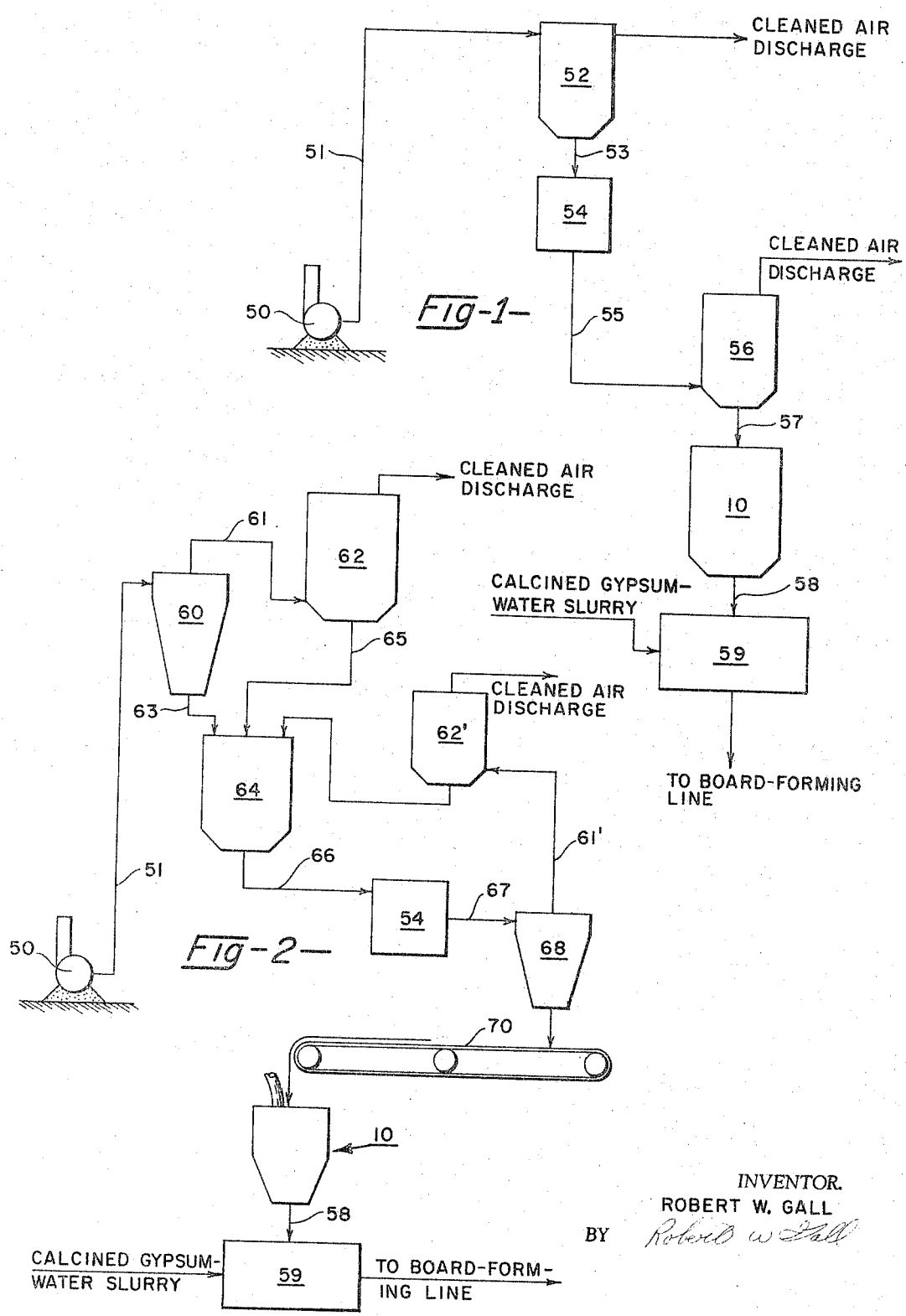

3,314,613
METHOD OF GRINDING AND INTRODUCING A SET-CONTROL AGENT INTO A GYPSUM SLURRY
Robert W. Gall, Long Beach, Calif., assignor to Kaiser Gypsum Company, Inc., Oakland, Calif., a corporation of Washington
Filed Feb. 17, 1964, Ser. No. 345,364
5 Claims. (Cl. 241—19)

This invention relates to a method of introducing a set-control agent into a settable gypsum composition.

In the production of gypsum products, such as gypsum cast articles, or wallboard or tile, and for instance in the production of paper-covered gypsum-core board, it is customary in the industry to add a set-control agent. In the production of such products, raw gypsum rock, which is fully hydrated calcium sulfate, $CaSO_4 \cdot 2H_2O$, in most instances, is calcined to form the calcium sulfate hemihydrate, $CaSO_4 \cdot \frac{1}{2} H_2O$, and this in then admixed with water to form a plastic slurry, formed into the desired shape, either as a cast object or in the form of a board, and then hardened in the desired form, and is dried and is then ready for use. It is generally found that the calcined gypsum-water slurry sets, that is, forms interlaced gypsum crystals of fully hydrated calcium sulfate, $CaSO_4 \cdot 2H_2O$, in a time period which is undesirable. In many instances this setting time is too slow and therefore an accelerator is added which increases the rate of set so that the final hardened product is obtainable in a reasonable amount of time in the usual industrial production line. The difficulties of uniform feed or introduction of such set-control agent into the gypsum slurry in industrial practice has restricted the types of accelerator which can be usefully employed, and has resulted in substantial costs to the industry.

According to the present invention, it has now been discovered that comminuted preformed paper-covered gypsum-core board can be uniformly introduced into fresh amounts of calcined gypsum-water plastic slurry to ensure excellent control of the setting characteristics of such slurry when the slurry is cast into shape, then hardened and dried. Such a cast shape can be a paper-covered gypsum-core board. In a particular manner, the invention enables a practical and economical board-forming operation, on an industrial scale, employing such comminuted material as set-control agent. According to this invention such preformed gypsum board is comminuted, the comminuted particles are suspended in a gas, preferably air, and the resulting suspension is introduced into a separator zone. In this latter zone, the solids particles are removed from the suspension and are separately recovered, while cleaned gas, e.g. air, goes off and is discharged. In one advantageous embodiment the larger particles are first removed by centrifugal force, for instance, by subjecting the suspension to cyclonic motion in a cyclone separator of conventional design, and are separately recovered, while the dust-laden gas issuing from this first separator zone or cyclone separator is taken off and conveyed to a second separator zone where the dust is separately recovered from the gas, in any desired manner. The recovered dust and the larger particles which have been recovered are then mixed together and the admixture is finely ground to form the desired finely divided set-control agent or accelerator for a calcined gypsum-water slurry. This accelerator or agent is conveyed to a holding tank or storage zone and is agitated in this zone to maintain the admixture in constant motion, that is, in freely mobile state. It is advantageous to so agitate in the presence of a gas, such as air, e.g. in a container which is only partially filled with the solid particles, leaving an air space or freeboard thereabove.

In the first comminuting step, there can be recovered, for example, the particles which are formed by sawing pre-formed boards as described herein to size or sawing to trim the finished board. Alternatively, in this zone culls or broken pieces of such finished board from a previous operation are comminuted, suitably to particles of minus 1/8 inch in diameter. Particles so obtained are taken up or suspended in a gas, preferably air, and are conveyed to a separating zone. In one advantageous operation, the first separator is a cyclone separator wherein the suspension of particles in air are subjected to cyclonic motion, that is to centrifugal separation, whereby the larger particles are withdrawn separately from the gas or air, the latter still containing the smaller or dust particles in suspension. The dust particles are then separated from the gas and this is suitably done by conveying the dust-laden gas to a bag-house where the dust-laden gas enters adjacent the base of an enclosure in which filter bags are hung in the known manner, and passes upwardly, the dust particles being removed on the filters and cleaned gas going off from the top of the enclosure. At intervals the bag filters are shaken and the dust particles fall to the base where they are withdrawn. The withdrawn dust particles and the larger particles which had been removed in the cyclone separator or otherwise as desired, are then preferably introduced into a mixing zone where they are mixed together. The admixture of dust and particles is conveyed to a further grinding zone where the whole mixture is ground to a more uniformly fine particle size, preferably to minus 100 mesh. This is suitably a closed circuit grinding zone. It will be understood that the material derived from the paper-covered gypsum-core boards and so recovered and ground comprises particles of set gypsum core and paper fibers. It will also be understood that the board can include and usually includes, besides the set gypsum crystals, small amounts of additives such as are common in this art, for example, starch or other adhesives, expanded perlite, glass fibers, asbestos fibers, waste sulfite liquor or other additives common in this art or any desired admixture of these additives, in the usual amounts.

The finely ground admixture of such gypsum core material and paper fibers is very advantageous for introduction into fresh amounts of calcined gypsum-water slurry to act therein as a set-control agent, or accelerator. It is a particular advantage that the amount of accelerator is substantially reduced when finely divided preformed board of this type is employed as such agent. It has been found that, whereas about 47 lbs. of raw gypsum particles and 8 lbs. of potash ($K_2CO_3$) are normally required per 1000 sq. ft. of board produced, the process according to the present invention enables production of excellent board with the incorporation of only about 29 lbs. finely ground accelerator agent made as described herein and about 0.8 lbs. potash.

This admixture of gypsum particles and paper fibers packs into a dense, immobile mass very readily and when placed in a storage tank or bin is very difficult to discharge therefrom because of interlacing of the fibers and packing and bridging. According to the present invention this finely divided material is now conducted to a container wherein it is maintained in continuous agitation, or is continuously agitated, in order to maintain the mass in freely mobile state; and in this manner there is enabled a uniform and continuous feeding or introduction into fresh amounts of calcined gypsum-water slurry.

The accompanying drawings illustrate some modes of carrying out the process of this invention and one embodiment of the apparatus of this invention; and in these drawings:

FIGURE 1 is a flow sheet of one suitable mode of practicing the invention.

FIGURE 2 is a flow sheet of a further mode of practicing the invention.

As an example of one mode of carrying out the process of this invention according to the flow sheet of FIGURE 1, an amount of preformed, gypsum-core, paper-covered board is comminuted in breaker device 50, of any desired type, to substantially entirely pass through a ⅛ inch screen; and the comminuted product is pneumatically conveyed in an air stream through line 51 to separator zone 52, which can suitably be a baghouse of conventional design wherein the solids are separated from the air, the cleaned air going off as indicated and the solids being conveyed likewise pneumatically, through 53 to a grinding zone 54. In the grinding zone, the particles are further ground to substantially all passing 100 mesh; and are then conducted in an air stream pneumatically through line 55 to separator zone 56, which is also suitably a baghouse wherein the solids are filtered from the air and cleaned air goes off as indicated. The filtered solids are then conducted, suitably by a conveyor belt, if desired, at 57 to container 10 wherein they are kept in constant motion and freely mobile. Suitably, in a preferred embodiment, a substantial freeboard is maintained in 10 above the top of the agitated solids. From 10 the freely mobile solids are withdrawn at 58 and fed into mixing zone 59 where they are incorporated in the plastic calcined gypsum-water slurry and thereafter fed to the board line as indicated.

As another example of the operation of the process of the invention, reference is made to the flow sheet of FIGURE 2. An amount of preformed paper-covered gypsum-core wallboard, including culls or sawn pieces, is placed in the breaker or comminuter 50 where they are broken and comminuted to particles substantially entirely passing ⅛ inch mesh screen. The ground material is pneumatically conveyed through the line 51 to cyclone separator 60 where the larger pieces are withdrawn at the bottom through line 63 and brought into mixing zone 64. The gas-laden air is drawn off at the top of the cyclone device and conveyed at 61 to a bag filter chamber 62 where the suspension is filtered through cloth bags; and cleaned air is discharged at the top, and the dust recovered on the bag filters is removed at the bottom through line 65 and conducted to chamber 64 where it is mixed together with the larger particles and the admixture is conveyed along element 66 which is suitably a conveyor belt, to a grinding zone 56 where substantially all of the material is reduced to minus 100 mesh. The ground material from grinding zone 56 is pneumatically conveyed through line 67 to a further cyclone separator 68 where a major portion of the solid particles are withdrawn at the bottom as solid product and dust-laden gas goes off through line 61' and is preferably also recycled to bag filters 62' to recover the dust contained therein, recycling the latter to mixing zone 64.

The solids coming off at the bottom of cyclone 68 are fed to a conveyor belt 70 and then into container 10 a preferred embodiment of which is more fully described and claimed in my copending patent application, Serial No. 578,912, filed July 18, 1966, wherein the accelerator particles are kept in constant motion and in freely mobile state. As desired, the accelerator is drawn off through line 58 and fed to mixing zone 59 into which calcined gypsum-water slurry is also introduced and from which the slurry is fed to the board-forming line in the conventional manner.

It will be understood that the above specific description and drawings have been given for purposes for illustration only and that variations and modifications can be made therein without departing from the spirit and scope of the appended claims. In the drawings, like parts are given like numbers, for convenience.

Having now described the invention, what is claimed is:

1. In a method of introducing a set-control agent into calcined gypsum-water slurry in a process wherein calcined gypsum-water slurry is cast into shape and the shape then hardened and dried, the steps comprising:
   (a) a comminuting preformed paper-covered gypsum core board to form comminuted particles thereof,
   (b) suspending said particles in a gas,
   (c) conveying said suspension to a first separator zone,
   (d) there separating said particles from said gas and recovering said particles,
   (e) finely grinding said recovered particles to form finely divided set-control agent for calcined gypsum-water slurry,
   (f) conveying said finely divided agent to a holding and feeding zone, and
   (g) agitating in said zone to maintain said finely divided set-control agent in freely mobile state.

2. In a method of introducing a set-control agent into calcined gypsum-water slurry in a board-forming line wherein calcined gypsum-water slurry is deposited between paper liners, formed into board, hardened and dried, the steps comprising:
   (a) comminuting preformed paper-covered gypsum core board to form comminuted particles thereof,
   (b) suspending said particles in a gas,
   (c) conveying the resultant gas-particles suspension to a first separator zone,
   (d) there removing larger particles from said suspension to separately recover a dust-laden gas.
   (e) conveying said dust-laden gas to a second separator zone,
   (f) separately recovering the dust from the gas in said second zone,
   (g) combining said larger particles and said recovered dust in a mixing zone,
   (h) finely grinding said combined particles and dust to form finely divided set-control agent for calcined gypsum-water slurry,
   (i) conveying said finely divided accelerator to a storage zone,
   (j) agitating in said zone to maintain said finely divided accelerator in freely mobile state.

3. In a method of introducing a set-control agent into calcined gypsum-water slurry in board-forming line wherein calcined gypsum-water slurry is deposited between paper liners, formed into board, hardened and dried, the steps comprising,
   (a) comminuting performed paper-covered gypsum-core board to form comminuted particles thereof,
   (b) suspending said particles in air,
   (c) conveying the resulting air-particles suspension to a first separator zone,
   (d) there removing larger particles from said suspension to separately recover dust-laden air,
   (e) conveying said dust-laden air to a second separator zone,
   (f) separately recovering the dust from the air in said second zone,
   (g) combining said larger particles and a said recovered dust in a mixing zone,
   (h) finely grinding said combined particles and dust to form finely divided set-control agent for calcined gypsum-water slurry, said agent consisting essentially of finely divided gypsum particles and paper fibers,
   (i) combining said finely divided agent to a storage zone,
   (j) continuously agitating in said zone to maintain said finely divided agent in freely mobile state.

4. In a method of introducing a set-accelerator agent into calcined gypsum-water slurry in a board-forming mine wherein calcined gypsum-water slurry is deposited between paper liners, formed into board, hardened and dried, the steps comprising,
   (a) comminuting performed paper-covered gypsum core board to form comminuted particles of said paper and said gypsum core,
   (b) suspending said particles in air, (c) conveying the resulting air-particles suspension to a first separator zone,
(d) there subjecting said suspension to cyclonic motion to remove larger particles and to separately recover a dust-laden air,
(e) conveying said dust-laden air to a second separator zone,
(f) separately recovering the said larger particles,
(g) separately recovering the dust from said air in said second zone,
(h) combining said larger particles and said recovered dust in a mixing zone,
(i) finely grinding said combined particles and dust to form finely divided accelerator for calcined gypsum-water slurry, said accelerator consisting essentially of finely divided paper and gypsum core,
(j) conveying said finely divided accelerator to a storage zone,
(k) continuously agitating in said zone to maintain said finely divided accelerator in freely mobile state.

5. In a method of introducing a set-control agent into calcined gypsum-water slurry in a board-forming line wherein calcined gypsum-water slurry is deposited between paper liners, formed into board, hardened and dried, the steps comprising,
(a) comminuting preformed paper-covered gypsum core board to form comminuted particles of said preformed gypsum core and comminuted paper fibers,
(b) suspending said particles and fibers in air,
(c) conveying the resultant air-particles and fibers in air, to a first separator zone,
(d) there subjecting said suspension to cyclonic motion to separately recover larger particles and a dust-laden air from said suspension,
(e) conveying said dust-laden air to a second separator zone,
(f) filtering the dust from said air in said second zone,
(g) combining said larger recovered particles and said filtered dust in a mixing zone,
(h) finely grinding said combined particles and dust to form finely divided accelerator for calcined gypsum-water slurry, said accelerator consisting essentially of finely divided gypsum core and paper fibers,
(i) conveying said finely divided accelerator to a storage zone,
(j) continuously agitating in said zone to maintain said finely divided accelerator in freely mobile state.

References Cited by the Examiner

UNITED STATES PATENTS

| | | | |
|---|---|---|---|
| 1,915,603 | 6/1933 | Gough | 156—39 |
| 1,984,201 | 12/1934 | Senseman | 241—18 X |
| 2,047,136 | 7/1936 | Doyle | 241—18 X |
| 2,337,162 | 12/1943 | McCleary | 241—19 |
| 3,181,985 | 5/1965 | Gates | 156—39 |

WILLIAM W. DYER, Jr., *Primary Examiner.*

H. F. PEPPER, Jr., *Assistant Examiner.*

UNITED STATES PATENT OFFICE
CERTIFICATE OF CORRECTION

Patent No. 3,314,613                              April 18, 1967

Robert W. Gall

It is hereby certified that error appears in the above numbered patent requiring correction and that the said Letters Patent should read as corrected below.

Column 4, line 3, strike out "a"; lines 46 and 72, for "performed", each occurrence, read -- preformed --.

Signed and sealed this 30th day of July 1968.

(SEAL)
Attest:

Edward M. Fletcher, Jr.                              EDWARD J. BRENNER
Attesting Officer                                       Commissioner of Patents